Figure 1:
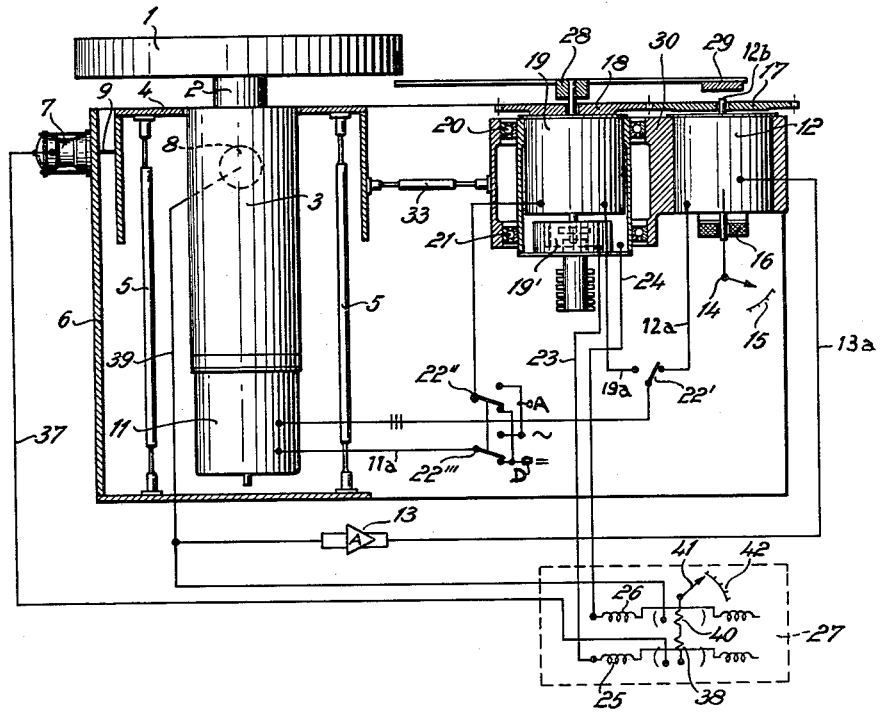

March 5, 1963  H. HACK  3,079,801
METHOD AND MACHINE FOR DETERMINING UNBALANCE
OF ROTATING WORKPIECES
Original Filed Sept. 2, 1958  2 Sheets-Sheet 1

INVENTOR

Heinrich Hack

United States Patent Office 3,079,801
Patented Mar. 5, 1963

3,079,801
METHOD AND MACHINE FOR DETERMINING UNBALANCE OF ROTATING WORKPIECES
Heinrich Hack, Darmstadt, Germany, assignor to Carl Schenck Maschinenfabrik G.m.b.H., Darmstadt, Germany, a corporation of Germany
Continuation of application Ser. No. 758,428, Sept. 2, 1958. This application Nov. 14, 1960, Ser. No. 69,224
Claims priority, application Germany Sept. 6, 1957
15 Claims. (Cl. 73—462)

My invention is disclosed and claimed herein as a continuation of my copending application Serial No. 758,428, filed September 2, 1958, to be abandoned after the filing date of the present continuation.

The invention relates to machines for determining unbalance of rotating workpieces by means of devices that respond to oscillations caused by such unbalance and that convert such oscillations into characteristic physical values, such as electric voltages, indicative of the magnitude and angular position of the unbalance. These voltages or other physical criteria indicative of the unbalance, are supplied to receiving devices where they are utilized for indicating, recording or controlling purposes. The unbalance criteria results from the displacement of the gravity center of the workpiece which displacement is constituted by the quotient of the unbalance and the weight of the workpiece. Hence, for calibrating the indicating or recording instruments, the known methods and devices require performing a preliminary calibrating run of the workpiece with an intentionally added, known unbalance for determining the effect of the workpiece weight or the unbalance-to-weight quotient. This additional calibrating run is undesirably time-consuming particularly when different individual workpieces or only small series of workpieces are to be balanced.

It is an object of my invention to devise means which afford an absolute determination of the unbalance of a rotating body irrespective of its weight. Another object, akin to the one just mentioned, is to provide means for determining the unknown unbalance of various rotatable workpieces that may greatly differ from each other in weight, without requiring a re-setting of the balance-analyzing equipment when changing from a workpiece of one weight to a workpiece of different weight.

To this end, I proceed by forming a quotient from two different unbalance criteria, namely one criterion, such as the output voltage of an oscillation pickup, characteristic of the unbalance (U) of the rotating workpiece under observation, and another criterion which is characteristic of the sum (U') of the unbalance (U) of the workpiece plus a known unbalance magnitude ($U_K$) which manifests itself by oscillations in synchronism and in phase with the unbalance (U) of the workpiece. The quotient $$Q = \frac{U}{U'} = \frac{U}{U + U_K}$$

then is proportional to the workpiece unbalance regardless of the weight of the workpiece.

According to another feature of my invention, the known unbalance ($U_K$) to be added to the unbalance (U) of the workpiece for forming the above-mentioned sum (U') as one term of the quotient to be determined, is produced by placing an auxiliary rotor having the known unbalance ($U_K$) in rotation upon a carrier which, like the journalling structure for the workpiece, is oscillatorily supported so that the known unbalance of the rotor excites the carrier to oscillations which are added to those of the workpiece journalling structure by means of a mechanical coupling of a given direction. Applicable instead of a rotating auxiliary rotor of known unbalance, is any other suitable oscillator or magnetic exciter capable of producing sinusoidal reference oscillations equivalent to those produced by the known unbalance.

The equation of the above-mentioned quotient indicative of the unknown unbalance irrespective of the weight of the workpiece can be expressed as:

$$U = \frac{U'}{\frac{\rho'}{\rho} - \cos \varphi}$$

For $\varphi = 0$ this equation can be written as $$U = \frac{U'}{\frac{\rho'}{\rho} - 1}$$

wherein:

U denotes the unbalance of the rotating workpiece 1,
U' denotes the sum of the unknown unbalance U of the rotating workpiece 1 plus the known unbalance $U_K$,
$\rho$ denotes the displacement, caused by unbalance U, of the center of gravity from the axis of rotation of the workpiece,
$\rho'$ denotes the corresponding displacement of the center of gravity due to the unbalance U', and
$\varphi$ denotes the phase angle between U and U'

According to further features of my invention, a preferred machine for performing the above-described method is provided with a supporting structure with journal means for accommodating the shaft on which the workpiece is rotatable, the supporting structure being connected with the rigid and fixed frame structure of the machine by spring means that permit the structure, when excited by unbalance of the workpiece during rotation of the latter, to perform oscillations in a given plane parallel to that of the workpiece rotation. The means for driving the workpiece are preferably mounted on the oscillatable supporting structure, and the pickup means for response to the oscillations are mounted in fixed relation to the machine frame structure. I further provide the machine with another oscillatingly supported structure or carrier on which another body, herein called rotor, is journalled for rotation in a plane parallel to that of the workpiece rotation, this rotor having an unbalance of known magnitude. During operation of the rotor, the carrier is excited to unbalance-responsive oscillations but it can oscillate only in a plane also parallel to that of the workpiece rotation. The supporting structure for the workpiece and the carrier for the rotor are coupled with each other for transmission of oscillations in a given direction so as to produce in said given direction a resultant oscillation corresponding to the sum of the unbalance effects caused by the workpiece unbalance plus the known unbalance of the rotor. The unbalance oscillations of the workpiece-journalling structure are converted by a suitable oscillation pickup into a physical magnitude, for example an electric alternating voltage, indicative of the workpiece unbalance alone. The resultant oscillations in the above-mentioned given direction, caused by sum of workpiece unbalance plus known unbalance, are converted by another pickup into another criterion, such as an electric voltage, indicative of these resultant oscillations. I further connect a ratio-measuring device with both oscillation pickups so that the device supplies an output magnitude, such as a resultant voltage, which is proportional to the quotient of the two unbalance criteria. This output magnitude is indicative of the workpiece unbalance irrespective of the weight of the workpiece and can be indicated recorded or used for control purposes, such as for controlling the operation of an unbalance-correcting machine tool.

In such a machine according to the invention, the workpiece-journalling structure is preferably formed by a housing which is supported on the rigid base of frame structure of the machine by means of spring rods so oriented that the housing and all components connected therewith can oscillate only in a single plane parallel to the plane of workpiece rotation. The pickup devices and preferably the quotient-measuring device are preferably mounted on the rigid frame structure in such a manner that the two pickups respond to oscillations in two respective directions of which one is parallel to the above-mentioned given direction of coupling between journalling structure and rotor carrier, and the other is perpendicular thereto. For determining unbalance in several planes, the above-described devices are to be duplicated or otherwise modified, for example by using a so-called isotropic support of the workpiece-journalling structure and by using a corresponding number of auxiliary rotors or other excitation devices.

While according to the above-described preferred embodiment of a machine according to my invention, the oscillatory effect of a known unbalance ($U_K$) is produced by a rotor whose unbalance-responsive oscillations are transmitted preferably by spring rods onto the journalling support for the workpiece, it is also within the scope of my invention to use other types of oscillators for producing an oscillation equivalent to the known unbalance.

The invention will be more fully understood from the embodiment of a balancing machine for determining unbalance in a single plane schematically illustrated by way of example on the accompanying drawing on which—

Figure 2:
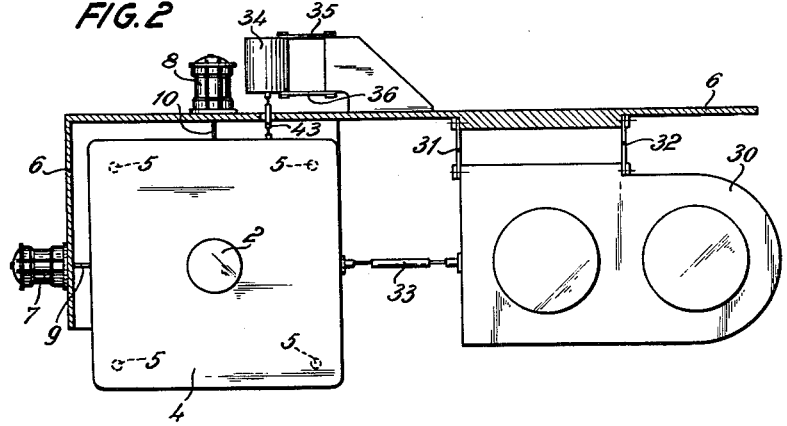
Figure 3:
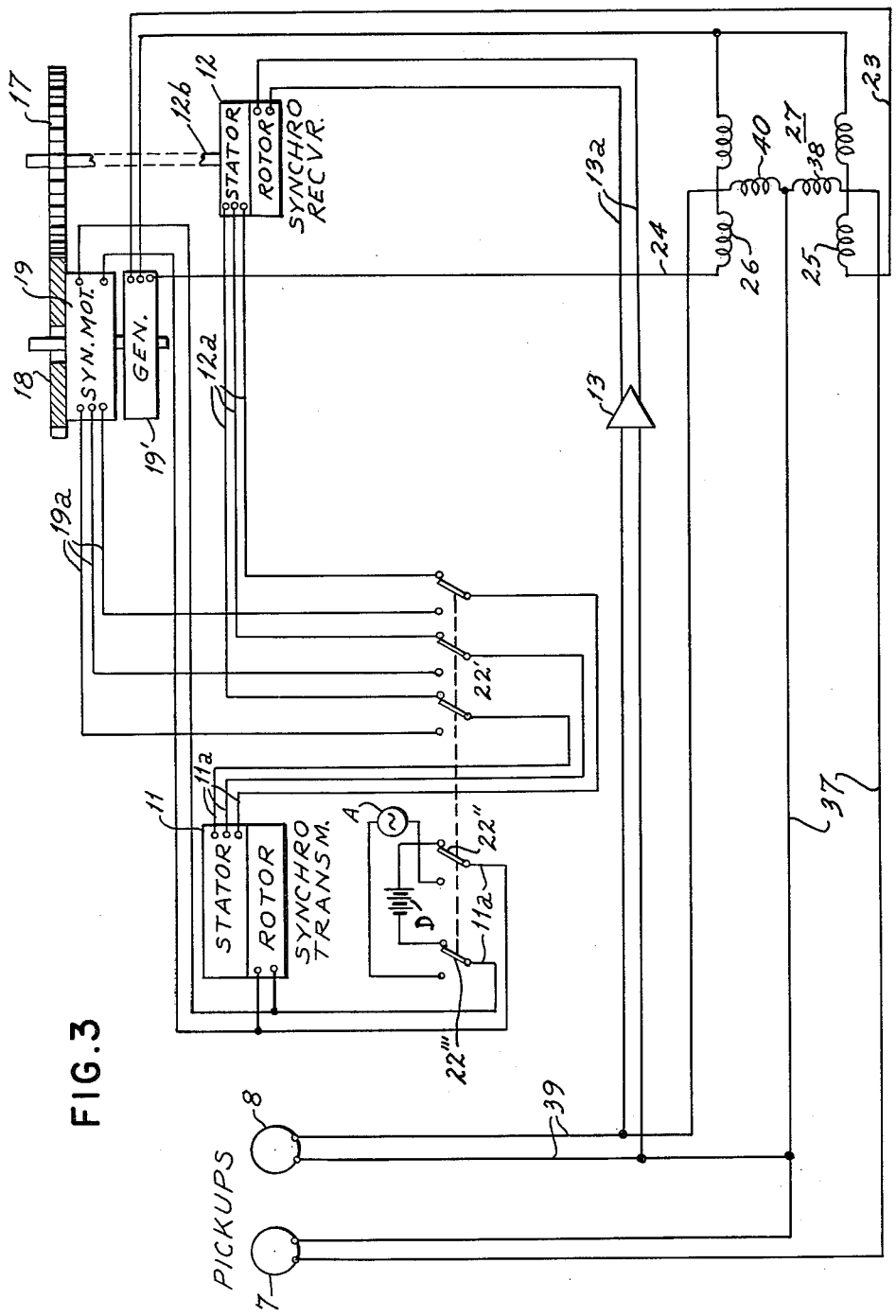

FIG. 1 is a partly sectional front view of the machine and also shows schematically an appertaining electric circuit diagram in single-line representation, FIG. 2 is a top view of the same machine, and FIG. 3 is an electric circuit diagram corresponding to FIG. 2.

The workpiece 1 is mounted on a shaft 2 connected or integral with the shaft of an electric motor 3. The motor 3 is flanged or otherwise rigidly joined together with a housing structure 4 which is supported on the rigid base or frame structure 6 of the machine by means of spring rods 5 so oriented that the housing 4 is capable of oscillating relative to the rigid frame structure 6 only in a plane, or in planes parallel to that of the workpiece rotation. Mounted on the rigid frame structure 6 are electric oscillation pickups 7 and 8 whose respective feeler rods 9 engage the housing structure 4 in order to convert the unbalance-responsive oscillations of the housing into respective electric voltages. The pickup axes extend in mutually perpendicular directions within respective planes parallel to that of the workpiece rotation. Joined with motor 3 is a synchro-generator 11 which is coupled with the motor shaft to run in synchronism with the workpiece.

The synchro-generator 11 is electrically connected through a control switch 22′ and a lead 12a with a synchro-receiver 12 and produces a three-phase field current which is supplied to the synchro-receiver 12 to cause the receiver to place its shaft 12b into the same angular position as the one occupied by the shaft of the synchro-generator 11. The generator 11 and the receiver 12 thus form together an alternating-current synchro-link, operating as an angular-position transmitting device. Details of the synchros 11 and 12 and their interconnection are not further described in this specification because such synchro-links are generally known and are available in the trade, for example under the trade name Selsyn or Synchrotie. A description and explanation of such synchro-devices may be found, for instance, in the book Analysis of Feedback Control Systems by Robert A. Bruns and Robert M. Saunders, McGraw-Hill Book Company, Inc., New York, 1955, Chapter 10.3 A.-C. Synchros, page 188 and following. If desired, reference may also be had to my co-pending patent applications Serial No. 606,929, filed August 29, 1956, now U.S. Patent No. 2,933,984, and Serial No. 743,350, filed June 20, 1958, both assigned to the assignee of the present invention, where suitable synchro-links are illustrated and described in detail.

The shaft 12b of the synchro-receiver 12 carries a spur gear 17 which meshes with a spur gear 18 fixed to the stator or housing of a synchronous drive motor 19. Mounted on the shaft of motor 19 is a disc-shaped rotor 28 which carries an unbalance member 29 of known magnitude. The synchro-receiver 12 and the drive motor 19 are mounted in a common housing 30. This housing, hereinafter called "carrier," is supported on the rigid frame structure 6 of the machine by means of leaf springs 31, 32, so as to be capable of oscillations in only one plane which is parallel to the plane of workpiece rotation and corresponds to the plane of illustration in FIG. 2. While the stator of synchro-receiver 12 is firmly joined with the carrier 30, the stator of drive motor 19 is rotatable within carrier 30 and for that purpose is mounted in ball bearings 20 and 21.

When commencing the balancing operation, with workpiece 1 mounted on shaft 2, the rotor of the synchro-generator 11 is excited by direct current which, at that stage of operation, is supplied from a direct-current source D through a switch 22′′′ and a lead 11a. The rotor of the synchro-receiver 12 receives alternating voltage from oscillation pickup 8 through a lead 39, an amplifier 13, and a lead 13a. Under these conditions, the rotor of synchro-receiver 12 and thus the shaft 12b adjust themselves in accordance with the angular position of the unbalance of workpiece 1. This position is indicated on a scale 15 by means of an indicating device 14 connected with the shaft 12b. The position is then fixed by actuating a magnetic clutch or brake 16.

Since the shaft 12b of synchro-receiver 12 is coupled through spur gears 17, 18 with the stator of motor 19, this stator is now also set relative to carrier 30, to an angular position which corresponds to the angular position of the workpiece unbalance.

After the workpiece unbalance and the auxiliary unbalance 29 are thus set to in-phase position, a switch, comprising the contact 22′, 22″ and 22′′′, is actuated. As a result, the synchro-generator 11 is disconnected at contact 22′ from the synchro-receiver 12 which then becomes inactive with its shaft 12b kept arrested by clutch 16 in the adjusted position. At the same time, the contact 22′ now connects the output of the synchro-generator 11 through a lead 19a with the synchronous drive motor 19, and contact 22′′′ disconnects the direct-current source D from the rotor of the synchro-generator 11 and instead connects it with an alternating current source A. As a result, the drive motor 19 now runs in synchronism with the generator 11 and hence in synchronism with the workpiece 1 as soon as the latter is driven and brought to the normal balancing speed by means of the drive motor 3. Under such conditions, the auxiliary unbalance caused by the weight member 29 is synchronized in zero-phase relation with the workpiece so that the oscillations to which the structure 4 on the one hand and the carrier 30 on the other hand are excited by the workpiece unbalance and the known unbalance respectively are in phase with each other.

The carrier 30 and the structure 4 are mechanically coupled with each other by a spring rod 33 which extends in a horizontal direction parallel to the active direction of the above-mentioned pickup. The connecting rod 33 in coaction with the leaf-spring supports 31, 32 has the effect that the oscillations of the carrier 30 caused by the known unbalance are cumulatively related to the oscillation component of the structure 4 caused by the workpiece unbalance in the same direction. Consequently, this directional component of the unbalance-responsive oscillations of structure 4 is dependent upon, and characteristic of, the sum of the two unbalance effects. Consequently, the electric voltage generated by the pickup 7 is also indicative of this sum.

The pickup 8 has an active direction perpendicular to that of pickup 7 and thus responds only to the component oscillations of the structure 4 that are caused by the unbalance of the workpiece 1. Consequently, the voltage generated by pickup 8 is characteristic of the workpiece unbalance only.

The two voltages of the respective pickups 7 and 8 are supplied to a ratio-measuring instrument 27 for forming the above-mentioned quotient. While various types of quotient-computing devices are available and applicable, the one preferably used and schematically illustrated in FIG. 1 is of the dynamoelectric type. It comprises two stationary field coils 25 and 26, and two moving coils 38 and 40 mounted on the same spindle and cooperating with the coils 25 and 26 respectively. The spindle of the moving coils carries a pointer 41 cooperating with a scale 42 graduated in values of quotient, or preferably directly in magnitudes of unbalance of the workpiece.

The two moving coils 38 and 40 are energized through respective leads 37 and 39 by the voltages generated by pickups 7 and 8 respectively. The fixed coils 25 and 26 receive sinusoidal current from a phase reference generator 19′ through respective leads 23 and 24. The phase reference generator is shown coupled with the shaft of motor 19 to operate in synchronism with the workpiece rotation so that the currents generated by generator 19′ are also in synchronism with the workpiece rotation. It will be understood that the phase reference generator 19′, if desired, may also be connected with the shaft 2 of motor 3 because it is only essential that the generated sinusoidal currents be synchronized with the workpiece rotation. The reference generator 19′, as well known in the balancing art, produces two sinusoidal voltages 90° phase displaced from each other. Thus, the lead 23 supplies the coil 25 of the quotient-forming device 27 with a sine current, whereas the lead 24 supplies the coils 26 of the same device 27 with a cosine current. As explained above, the magnitude indicated by the quotient-forming device 27 is indicative of the unbalance of the workpiece 1 irrespective of the weight of the workpiece, and the machine is capable of accurately indicating unbalance even if the workpiece is substituted by a workpiece of different weight, without requiring calibration or re-setting of the measuring equipment.

In machines intended for rotating the workpiece at supercritical speeds, the mass of the machine components participating in the unbalance-responsive oscillation may affect the measuring result. For that reason, the illustrated machine is provided with an auxiliary mass 34 which is connected with the rigid frame structure by leaf springs 35 and 36 so as to be capable of performing oscillations relative to the frame structure in a plane parallel to that of the workpiece rotation. The weight of mass 34 is preferably made substantially equal to the sum of the weights of the parts that produce the known-unbalance oscillations of carrier 30. The auxiliary mass 34 is coupled by a spring rod 43 with the workpiece-journalling structure 4, the spring 43 extending in a direction parallel to the active direction of pickup 8. The auxiliary mass permits compensating the mass inertia movements of the exciter housing 30 in the active direction of the oscillation pickup 8.

It will be apparent to those skilled in the art upon studying this disclosure, that machines according to the invention permit a variety of modifications and hence may be embodied in design other than the one illustrated and particularly described herein, without departing from the essence of my invention and within the scope of the claims annexed hereto.

I claim:

1. A machine for determining unbalance of a rotating workpiece, comprising an oscillatorily mounted structure having shaft means for rotating the workpiece on said structure, said structure being capable of oscillation in a plane parallel to that of the workpiece rotation in response to unbalance of the workpiece, an auxiliary oscillator corresponding to a known unbalance, synchronizing means interconnecting said shaft means and said oscillator for synchronizing the respective oscillations of said structure and said oscillator in phase with each other, said oscillator being mechanically coupled with said structure relative to a given direction whereby said respective oscillations combine to a cumulative resultant oscillation in said direction, a first oscillation pickup responsive to said resultant oscillation in said direction to furnish an output substantially corresponding to the sum of the workpiece unbalance plus said known unbalance, a second oscillation pickup responsive to oscillation of said structure to furnish an output substantially corresponding to the workpiece unbalance only, and quotient-forming device connected to said two pickups and responsive to said two pickup outputs, whereby said device forms a quotient whose value is indicative of the workpiece unbalance regardless of the weight of the workpiece.

2. A machine for determining unbalance of a rotating workpiece, comprising an oscillatorily mounted structure having shaft means for rotating the workpiece on said structure, said structure being capable of oscillation in a plane parallel to that of the workpiece rotation in response to unbalance of the workpiece, a carrier oscillatorily mounted and capable of oscillation in a given direction of a plane parallel to that of the workpiece rotation, an auxiliary rotor of known unbalance journalled on said carrier for rotation in a plane parallel to that of the workpiece rotation, said carrier and said structure being mechanically coupled for joint oscillatory motion in said given direction whereby the respective unbalance-responsive oscillations of said structure and said carrier combine themselves to a resultant oscillation in said given direction, synchronizing means interconnecting said shaft means and said rotor for rotating them simultaneously with said workpiece unbalance and known unbalance in phase with each other, a first oscillation pickup responsive to said resultant oscillation in said given direction, a second oscillation pickup responsive to oscillation of said structure in another direction coordinately related to said given direction to respond substantially only to said workpiece unbalance, a quotient-forming device connected to said two pickups to form a value corresponding to the workpiece unbalance independently of the weight of the workpiece.

3. A machine for determining unbalance of a rotating workpiece, comprising an oscillatorily mounted structure having shaft means for rotating the workpiece on said structure, said structure being capable of oscillation in a plane parallel to that of the workpiece rotation in response to unbalance of the workpiece, a carrier oscillatorily mounted and capable of oscillation in a given direction of a plane parallel to that of the workpiece rotation, an auxiliary rotor of known unbalance journalled on said carrier for rotation in a plane parallel to that of the workpiece rotation, said carrier and said structure being mechanically coupled for joint oscillatory motion in said given direction whereby the respective unbalance-responsive oscillations of said structure and said carrier combine themselves to a resultant oscillation in said given direction, synchronizing means interconnecting said shaft means and said rotor for rotating them simultaneously, phase shift means interposed between said shaft means and said rotor for adjusting the phase angle between the workpiece unbalance and said known unbalance to zero, a first oscillation pickup responsive to said resultant oscillation in said given direction, a second oscillation pickup responsive to oscillation of said structure in another direction coordinately related to said given direction to respond substantially only to said workpiece unbalance, a quotient-forming device connected to said two pickups to form a value corresponding to the workpiece unbalance independently of the weight of the workpiece.

4. In a machine according to claim 2, said synchronizing means comprising an alternating-current generator mounted on said structure and coaxially joined with said shaft, and a synchronous motor mounted on said carrier and mechanically coupled with said rotor, said motor being electrically connected with said generator to be synchronously driven therefrom.

5. A machine according to claim 2, comprising a rigid machine frame, two sets of springs fastened to said frame and joined with said structure and said carrier respectively whereby said structure and said carrier are independently oscillatable relative to said frame, and spring-rod means interconnecting said structure and said carrier for coupling them to oscillate together in said given direction.

6. In a machine according to claim 3, said phase-shift means comprising a synchro-generator mounted on said structure and coaxially connected with said shaft, and a synchro-receiver electrically connected to said synchro-generator and mounted on said carrier, said synchro-receiver being mechanically coupled with said rotor for placing its known unbalance to zero-phase position relative to the workpiece unbalance.

7. In a machine according to claim 3, said phase-shift means comprising a synchro-generator mounted on said structure and coaxially connected with said shaft, and a synchro-receiver electrically connected to said synchro-generator and mounted on said carrier, said synchro-receiver being mechanically coupled with said rotor for placing its known unbalance to zero-phase position relative to the workpiece unbalance, and an indicating device connected with said synchro-motor for indicating the phase angle between said respective unbalances.

8. A machine for determining unbalance of a rotating workpiece, comprising an oscillatorily mounted structure having shaft means for rotating the workpiece on said structure, said structure being capable of oscillation in a plane parallel to that of the workpiece rotation in response to unbalance of the workpiece, a carrier oscillatorily mounted and capable of oscillation in a given direction of a plane parallel to that of the workpiece rotation, an auxiliary rotor of known unbalance journalled on said carrier for rotation in a plane parallel to that of the workpiece rotation, said carrier and said structure being mechanically coupled for joint oscillatory motion in said given direction whereby the respective unbalance-responsive oscillations of said structure and said carrier combine themselves to a resultant oscillation in said given direction, a synchro-generator mounted on said structure and coaxially connected with said shaft, a drive motor mounted on said carrier for rotating said rotor in synchronism with said shaft when energized from said generator, said drive motor having a stator angularly displaceable about its axis relative to said carrier, a synchro-receiver also mounted on said carrier and mechanically coupled with said stator for angularly displacing it when said synchro-receiver is energized from said generator, selective switch means for connecting said generator first to said synchro-receiver to set the phase angle between workpiece unbalance and known unbalance to zero and then connecting said generator to said drive motor for driving said rotor in synchronism with the workpiece, a first oscillation pickup responsive to said resultant oscillation in said given direction, a second oscillation pickup responsive to oscillation of said structure in another direction coordinately related to said given direction to respond substantially only to said workpiece unbalance, and a quotient-forming device connected to said two pickups to form a value corresponding to the workpiece unbalance independently of the weight of the workpiece.

9. A machine according to claim 8, comprising direct-current supply means and alternating current supply means, said switch means having a first position in which it connects said direct-current supply means to said generator to provide synchro-field excitation thereto and connects said generator to said synchro-motor, and said switch means having another position wherein it connects said generator with said alternating-current supply means and connects said drive motor with said generator for operating said drive motor.

10. In a machine according to claim 3, said two pickups consisting of electric transducers for converting the unbalance-responsive oscillations to respective voltages, and said quotient-forming device having two electric input circuits connected to said respective pickups to be energized by said respective voltages.

11. A machine according to claim 3, comprising a phase-reference generator for providing two sinusoidal reference currents of 90° phase displacement relative to each other, said phase-reference generator being mechanically connected with one of said shaft and rotor respectively whereby said currents are synchronous with the workpiece rotation, said two pickups consisting of electric transducers for converting the unbalance-responsive oscillations to respective voltages, and said quotient-forming device having an electrodynamic system comprising two stationary field coils and two moving coils coacting with said respective stationary coils and having a common mounting spindle, said stationary coils being connected with said phase-reference generator to be traversed by said respective two currents, and said moving coils being connected to said respective pickups to be excited by said respective voltages.

12. A machine according to claim 2, comprising a rigid machine frame on which said structure and said carrier are oscillatorily mounted, said two pickups being firmly connected with said frame, an auxiliary body whose weight corresponds approximately to that of the means for producing the known unbalance, said body being oscillatorily mounted on said frame for oscillation in a plane parallel to that of workpiece rotation, and means linking said body with said structure in a direction parallel to the active direction of said second pickup.

13. A machine for determining unbalance of a rotating workpiece, comprising a journal structure for rotatably mounting the workpiece, drive means for rotating the workpiece to produce oscillations of said structure due to unbalance of the workpiece, an auxiliary oscillator mechanically coupled with said structure for subjecting it to a known unbalance caused by said oscillator, said oscillator having means for phasing said oscillator to phase coincidence of the respective oscillations of said structure and said oscillator, oscillation expansive measuring means for measuring an unbalance criterion of the workpiece, measuring means for simultaneously measuring a corresponding unbalance criterion of the combined unbalances of workpiece and oscillator, quotient-forming means connected to said two measuring means for forming a quotient of both criteria, whereby said quotient is indicative of the workpiece unbalance regardless of the weight of the workpiece.

14. The method of determining unbalance of a rotating workpiece, which comprises rotating the workpiece about its axis to obtain oscillations in a plane transverse to the axis due to the workpiece unbalance to be determined, simultaneously imparting to the workpiece in a given direction parallel to said plane an auxiliary oscillation of known amplitude and phasing said auxiliary oscillations for phase coincidence with the unbalance oscillations, sensing an unbalance criterion of the workpiece in a direction angularly related to said given direction in said plane and simultaneously sensing substantially in said given direction a corresponding oscillation criterion of the combined unbalance oscillation and auxiliary oscillation, and forming a quotient of both criteria, whereby said quotient is indicative of the workpiece unbalance regardless of the weight of the workpiece.

15. The method of determining unbalance of a rotating workpiece by means of devices which produce criteria indicative of magnitude and angular position of the unbalance, which comprises rotating the workpiece to produce mechanical oscillations in a plane transverse to its axis due to unbalance of the rotating workpiece, simultaneously imparting periodic auxiliary oscillation to the workpiece in a given direction parallel to said plane and phasing said auxiliary oscillations to phase coincidence with the respective unbalance oscillations, sensing an unbalance criterion of the rotating workpiece in a direction angularly related to said given direction in said plane and translating said criterion into an electric magnitude, simultaneously sensing in said given direction a corresponding unbalance criterion of the combined unbalance oscillations and auxiliary oscillations and translating it into another electric magnitude, and electrically forming a quotient of both magnitudes, whereby said quotient is indicative of the workpiece unbalance regardless of the weight of the workpiece.

References Cited in the file of this patent
UNITED STATES PATENTS

| | | |
|---|---|---|
| 2,315,578 | Baker | Apr. 6, 1943 |
| 2,851,885 | Federn et al. | Sept. 16, 1958 |